United States Patent
Herve et al.

(10) Patent No.: US 12,533,681 B2
(45) Date of Patent: Jan. 27, 2026

(54) FROTHERS FOR MINERALS RECOVERY

(71) Applicant: SYENSQO SA, Brussels (BE)

(72) Inventors: Pascal Herve, Talence (FR); Renata Brito, Sao Paulo (BR); Joseph Jankolovits, Milford, CT (US); Matthieu Corbet, Vourles (FR); Philippe Marion, Vernaison (FR)

(73) Assignee: SYENSQO SA, Brussels (BE)

( * ) Notice: Subject to any disclaimer, the term of this patent is extended or adjusted under 35 U.S.C. 154(b) by 638 days.

(21) Appl. No.: 17/799,426

(22) PCT Filed: Feb. 12, 2021

(86) PCT No.: PCT/EP2021/053552
§ 371 (c)(1),
(2) Date: Aug. 12, 2022

(87) PCT Pub. No.: WO2021/160860
PCT Pub. Date: Aug. 19, 2021

(65) Prior Publication Data
US 2023/0137245 A1    May 4, 2023

(30) Foreign Application Priority Data
Feb. 14, 2020  (EP) .................................... 20157394

(51) Int. Cl.
*B03D 1/004* (2006.01)
*B03D 1/008* (2006.01)
*C07C 69/675* (2006.01)
*C07C 69/708* (2006.01)

(52) U.S. Cl.
CPC ........... *B03D 1/0043* (2013.01); *B03D 1/008* (2013.01); *C07C 69/675* (2013.01); *C07C 69/708* (2013.01); *B03D 2201/04* (2013.01); *B03D 2203/04* (2013.01); *B03D 2203/08* (2013.01)

(58) Field of Classification Search
CPC .... B03D 1/0043; B03D 1/008; C07C 69/675; C07C 69/708
See application file for complete search history.

(56) References Cited

U.S. PATENT DOCUMENTS

| | | | |
|---|---|---|---|
| 4,148,720 A | 4/1979 | Wang et al. | |
| 4,437,983 A * | 3/1984 | Petrovich | B03D 1/02 252/61 |
| 4,504,385 A | 3/1985 | Keys | |
| 4,589,980 A | 5/1986 | Keys | |
| RE32,778 E * | 11/1988 | Hansen | B03D 1/0043 252/61 |
| 7,022,861 B1 | 4/2006 | McElhanon et al. | |
| 7,074,936 B2 | 7/2006 | Caprioli et al. | |
| 9,816,054 B2 | 11/2017 | Saveliev et al. | |
| 2016/0200998 A1 * | 7/2016 | Maruyama | C10M 129/70 508/501 |
| 2021/0269740 A1 | 9/2021 | Okamoto et al. | |

FOREIGN PATENT DOCUMENTS

| | | |
|---|---|---|
| EP | 0605963 A2 | 7/1994 |
| JP | H0649790 A | 2/1994 |
| WO | 2019192990 A1 | 10/2019 |
| WO | 2020004468 A1 | 1/2020 |

OTHER PUBLICATIONS

Drzymala, et al., "Classification of Flotation Frothers", Minerals 2018, 8(2), 53, 24 pages.
Yoon, et al., "Photocyclization Reactions of (ω-Phthalimidoalkoxy)acetic Acids via Sequential Single Electron Transfer-Decarboxylation Pathways", Journal of Photoscience, 2000, vol. 7(4), pp. 143-148.
Tanaka, et al., "Design and Fabrication of Biosensing Interface for Waveguide-Mode Sensor", Langmuir, 2013, vol. 29(42), pp. 13111-13120.
Stern, et al., "Studies on the Gas-Liquid Chromatographic Separation of Diastereoisomeric Esters", Journal of Chromatography, 1969, vol. 39, pp. 17-32.
Khoshdast, et al., "Flotation Frothers: Review of Their Classifications, Properties and Preparation", The Open Mineral Processing Journal, 2011, vol. 4, pp. 25-44.
Int'l Search Report & Written Opinion of the ISA, Int'l Application No. PCT/EP2021/053552, mailed May 11, 2021.
Int'l Search Report & Written Opinion of the ISA, Int'l Application No. PCT/EP2021/053557, mailed May 10, 2021.

* cited by examiner

Primary Examiner — Ryan B Huang
Assistant Examiner — Adam Adrien Germain
(74) Attorney, Agent, or Firm — Osha Bergman Watanabe & Burton LLP

(57) ABSTRACT

The present invention pertains to a composition comprising at least one compound of formula (I) and to the use of said composition for recovering value minerals from ore and other feedstocks by flotation.

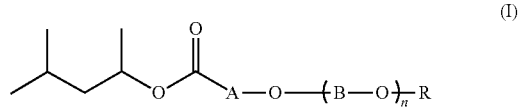

(I)

9 Claims, No Drawings

FROTHERS FOR MINERALS RECOVERY

The present invention pertains to a composition comprising at least one compound of formula (I) and to the use of said composition for recovering value minerals from ore and other feedstocks by flotation.

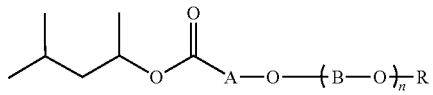

(I)

BACKGROUND

Froth flotation is a process for beneficiating ores containing valuable minerals generally named as "value minerals". Value mineral(s) refer to the metal, metals, mineral or minerals that are the primary object of the flotation process, i.e., the metals and minerals from which it is desirable to remove impurities.

A typical froth flotation process involves intermixing an aqueous slurry that contains finely ground ore particles with a "frother" or foaming agent to produce a froth. The grinding is normally done in water with the resultant slurry called the "pulp". The pulp is processed in the flotation cells, which agitate the mixture and introduce air as small bubbles. Ore particles that contain the value mineral(s) are preferentially attracted to the froth because of an affinity between the froth and the exposed mineral on the surfaces of the ore particles. The value minerals are then collected by separating them from the froth to give a concentrate, while gangue particles with poor or no affinity with the froth sink or stay in the liquid to give the tail.

Separation by froth flotation is based on the selective adhesion of air bubbles onto particles surface of targeted value mineral in a mineral/water slurry.

Froth flotation is a versatile process that can be adapted to separate a wide range of value minerals. Indeed, it is possible via chemical treatments to selectively enhance the affinity of mineral particles surface for the froth to which said particles are exposed e.g. by modifying hydrophobicities of mineral particles surface. Just as a matter of example to illustrate the versatility of the process, froth flotation is used for separating sulfide minerals from silica gangue and for coal recovery from (raw coal) a slurry of coal and guangue comprising e.g. carbonaceous materials with high ash content, shale, clay, and other non-carbonaceous impurities minerals such as kaolinite, quartz, dolomite, calcite, muscovite, pyrite and microline.

Frothers are used to provide basic froth phase required to perform the process while other reagents are used to control the relative hydrophibicities of the particles and maintain the proper froth characteristics. Among these reagents, one can cite —(i) collectors, which can be non-ionic, amphoteric, anionic, cationic compounds and mixture thereof; —(ii) modifiers, which can be activators or depressants i.e. which may increase or reduce the adsorption of collectors onto a given mineral surface.

Frothers can be selected from alcohols, polyglycols, alkoxy substituted paraffins, organic acids and amines. However they are generally chosen from alcohols, polyglycols and alkoxy substituted paraffins because they have practically no collecting properties (collectors) which is not the case e.g. for organic acids and amines. Frothers suitable for different applications can be found in Minerals 2018, 8(2), 53: "Classification of Flotation Frothers". MIBC i.e. 4-methyl-2-pentanol is one of the most commonly used flotation frother for coal, metal sulfide or non-sulfide flotation.

Industrially, froth flotation is a multi-stage process comprising —(i) rougher stage in which the process is designed to produce a concentrate in value minerals with high recovery (yield typically over 80%) —(ii) optional re-grinding of the concentrate obtained at rougher stage —(iii) cleaning stage in which the process is designed to take the rougher concentrate optionaly regrinded to produce a concentrate of higher grade. The cleaning may be repeated a few more times until a saleable concentrate is produced. In the case of copper, saleable concentrate generally ranges from 15% to 38% Cu.

Strong frothers are generally useful in the rougher stage to recover value minerals in high yield. More particularly, strong frothers are efficient for recovering coarse particles i.e. particles of relatively large size (i.e., as generally admitted, particles with diameter >100 μm).

After the regrinding stage, the coarse particles are now much finer in size. Weak frothers are generally useful in the cleaning stage to recover value mineral with high selectivity thus providing high grade concentrates. However, frothers typically carry over (and thus persist) from the roughing stage, through regring and cleaning stages.

It is generally admitted that commercially available frothers are either too weak in frothing properties which produces poor recovery (e.g. at rougher stage) or too strong in such properties which produces poor selectivity (e.g. at cleaner stage). In practice, plants typically use a combination of strong and weak frothers which is selected to balance the needs of the roughing and cleaning stages. Consequently there is a need for new frothers and new frother compositions.

There is a need for new composition comprising strong frother(s) that can be used for high yield recovery of value minerals by froth flotation. Ideally, this composition should be efficient to recover coarse particles of value minerals.

Having access to such stronger frother(s) and to such composition would allow to treat less finely ground ore particles during the flotation process and, consequently, would allow to reduce, the costs related to the energy spent during more drastic ore grinding conditions. Moreover, since the specific surface of coarse particles is reduced as compared to specific surface of thinner particles less collector would be required during the flotation process which would represent an economical and environmental advantage.

There is also a need for new composition comprising strong frother(s) that can be use in a sufficient amount to give strong froth behavior in the rougher stage without impairing, down the line, the process in the cleaning stage. Indeed, the possibility to use said frother in sufficient amount to give strong froth behavior should contribute to the high recovery of value minerals at the rougher stage and to the enhanced recovery of coarse particles of value minerals.

Generally, strong frother used at the rougher stage persists downstream in the flotation cells at the cleaning stage. It is then responsible for lower selectivity, operational tradeoffs in the circuit where the cells are operated less "aggressively" (i.e. increased froth depth and reduced airflow) at the expense of recovery, and for over-frothing i.e. excessive froth formation that is detrimental to the overall process by reducing the selectivity of the cleaning stage and/or leading to overflowing of the cleaner cells. In some situations, the use of large amounts of anti-foam agents (defoamers) are required in the cleaning circuit to control excess frothing thus generating additional costs.

There is also a need for strong frother likely to be transformed/cleaved into a less strong frother, or into a weak frother or even into a non-frother during the overall process and especially in between rougher and cleaning stages.

Having access to such "cleavable" stronger frothers would give the possibility to use them in a sufficient amount to give strong froth behavior thus contributing to high recovery of value minerals and to enhanced recovery of coarse particles of value minerals in the rougher stage and to the possibility of avoiding excessive frothing and reduced selectivity in the further stages such as cleaning stage.

Finally, there is a need for frothers compositions being less volatile than presently available ones and having higher flash points. Indeed a decrease of flammability of frothers compositions is highly desirable for safety reasons either during storage or during utilisation of said compositions. Just for the sake of example MIBC which is a commonly used frother is a highly flammable compound with a flash point of 41° C.

BRIEF SUMMARY OF INVENTION

The applicant have found surprisingly that the composition according to the invention could fulfill all these needs and more.

Thus, in a first aspect, the present invention pertains to a composition comprising at least one compound of formula (I):

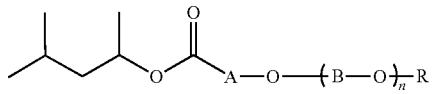

wherein

A represents a C1-C8 alkanediyl group that may be linear, branched or cyclic,

B which can be the same or different at each occurrence, represents a C1-C8 alkanediyl group that may be linear, branched or cyclic, R represents H or a C1-C8 alkyl group that may be linear or branched, and n is an integer ≥0 and ≤100.

In a second aspect, the present invention pertains to a flotation process for recovering value minerals from ore and other feedstocks comprising adding to said ore and other feedstocks a composition comprising at least one compound of formula (I):

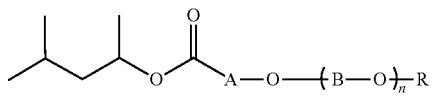

wherein A, B, R and n are as previously defined.

In a third aspect the invention relates to the use of a composition comprising at least one compound of formula (I):

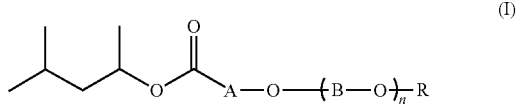

wherein A, B, R and n are as previously defined, for recovering value minerals from ores and other feedstocks by flotation.

DETAILED DESCRIPTION

Composition Comprising Compound of Formula (I)

The composition according to the invention comprises at least one compound of formula (I) as above disclosed.

Generally, in formula (I), A represents a C1-C8 alkanediyl group that may be linear, branched or cyclic.

Preferably, A is selected from the list consisting of —$CH_2$—, —$CH_2$—$CH_2$—, —$CH_2$—$CH_2$—$CH_2$—, —$CH_2$—$CH_2$—$CH_2$—$CH_2$—, —$CH_2$—$CH_2$—$CH_2$—$CH_2$—$CH_2$—, and —$CH(CH_3)$—. More preferably A is selected from the list consisting of —$CH_2$—, —$CH_2$—$CH_2$—, —$CH_2$—$CH_2$—$CH_2$—, and —$CH(CH_3)$—, even more preferably A is selected from the list consisting of —$CH_2$—, —$CH_2$—$CH_2$—$CH_2$—, and —$CH(CH_3)$—.

In some embodiments, A represents a linear C1-C8 alkanediyl group. In this case, preferably, A is selected from the list consisting of —$CH_2$—, —$CH_2$—$CH_2$—, —$CH_2$—$CH_2$—$CH_2$—, —$CH_2$—$CH_2$—$CH_2$—$CH_2$— and —$CH_2$—$CH_2$—$CH_2$—$CH_2$—. More preferably A is selected from the list consisting of —$CH_2$—, —$CH_2$—$CH_2$—, and —$CH_2$—$CH_2$—$CH_2$—, even more preferably A represents —$CH_2$— or —$CH_2$—$CH_2$—$CH_2$—.

Generally, B, which can be the same or different at each occurrence, represents a C1-C8 alkanediyl group that may be linear, branched or cyclic. Preferably B is selected from the list consisting of —$CH_2$—$CH_2$—, —$CH_2$—$CH(CH_3)$—, —$CH(CH_3)$—$CH_2$— and —$CH_2$—$CH_2$—$CH_2$—$CH_2$—. Preferably B represents —$CH_2$—$CH_2$— or —$CH_2$—$CH(CH_3)$— and more preferably B represents —$CH_2$—$CH_2$—.

In some preferred embodiments, the composition according to the present invention comprises at least one compound of formula (I) wherein A represents —$CH_2$— or —$CH_2$—$CH_2$—$CH_2$— and B represents —$CH_2$—$CH_2$—.

In another preferred embodiment, the composition according to the present invention comprises at least one compound of formula (I) wherein A represents —$CH(CH_3)$— and B represents —$CH_2$—$CH_2$—.

Generally, in formula (I), R represents H or a C1-C8 alkyl group that may be linear or branched. In some preferred embodiments R is H. In some other preferred embodiments R is chosen from the list consisting of methyl, ethyl, propyl, isopropyl, sec-butyl, t-butyl, isobutyl and n-butyl.

In some preferred embodiments, the composition according to the present invention comprises at least one compound of formula (I) wherein A represents —$CH_2$— or —$CH_2$—$CH_2$—$CH_2$—, B represents —$CH_2$—$CH_2$— and R is H.

In another preferred embodiment, the composition according to the present invention comprises at least one compound of formula (I) wherein A represents —$CH(CH_3)$—, B represents —$CH_2$—$CH_2$— and R is H.

Generally, in formula (I), n is an integer ≥0 and ≤100. Preferably n is an integer ≥0 and ≤50; more preferably n is an integer ≥0 and ≤20; even more preferably n is an integer ≥0 and ≤10.

In some embodiments, n is chosen from 1 to 10, preferably from 1 to 6 and more preferably from 1 to 4.

In some preferred embodiments, the composition according to the present invention comprises at least one compound selected from the list consisting of

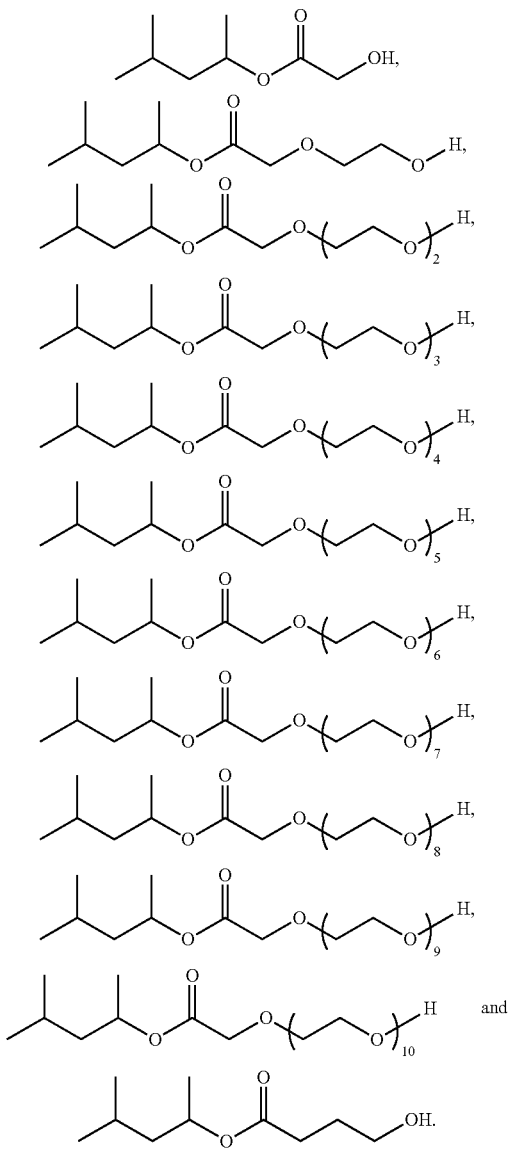

In some other preferred embodiments, the composition according to the present invention comprises at least one compound selected from the list consisting of

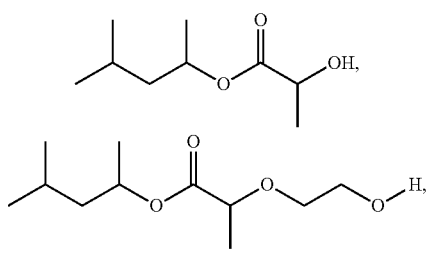

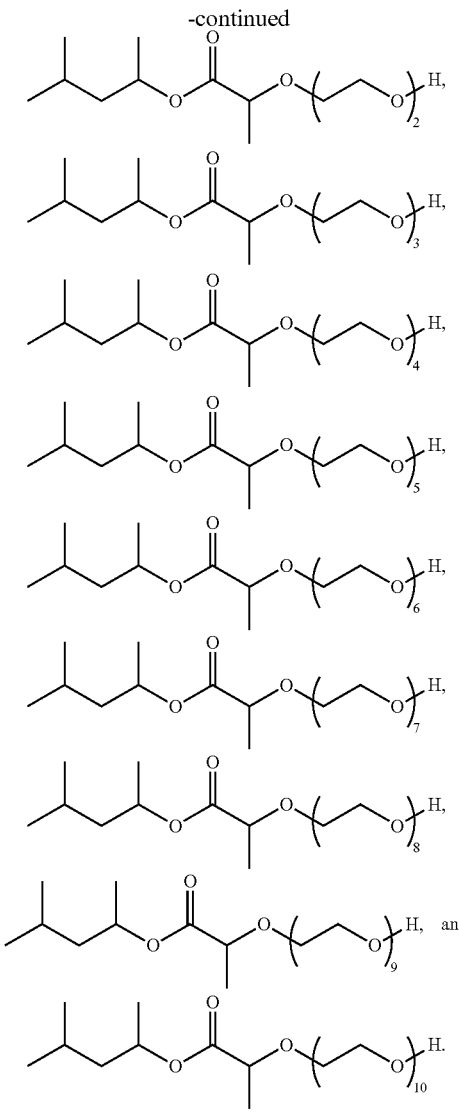

In some embodiments, the composition according to the invention comprises at least two compounds of formula (I).

Just as a matter of example, the synthesis of compounds of formula (I) in accordance with the present invention can be carried out by the different routes A to E below.

Route A

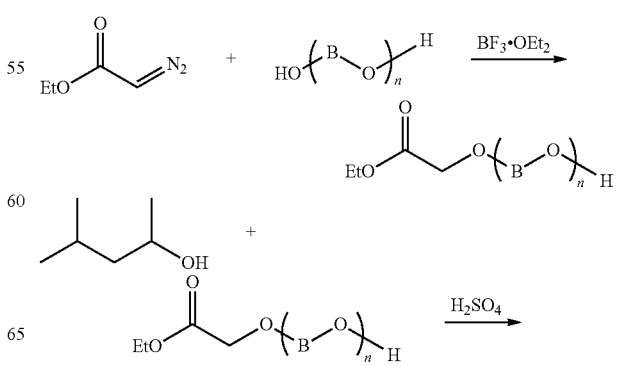

Route B

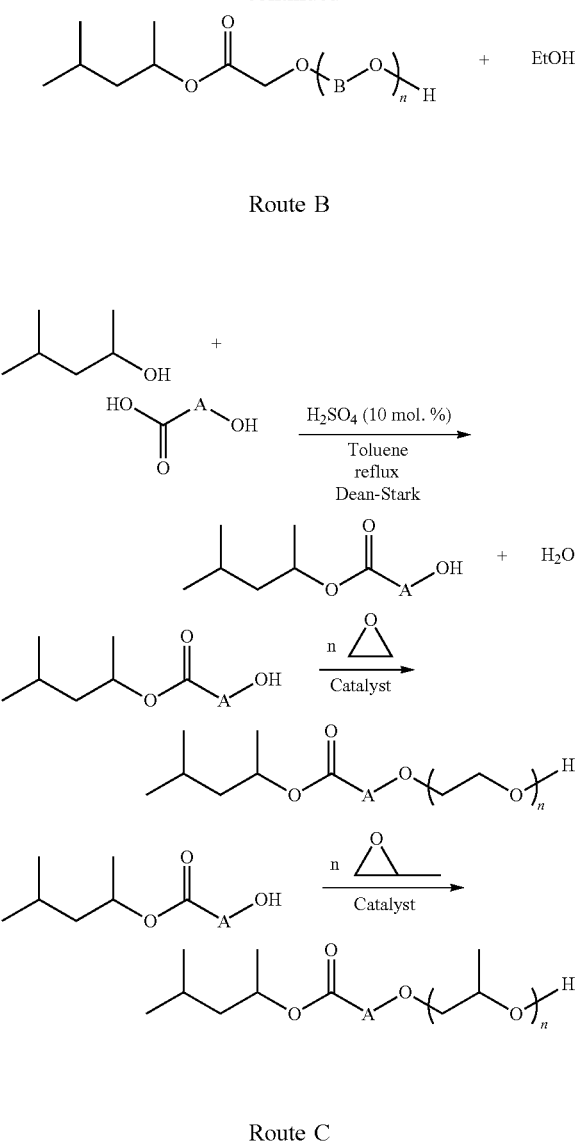

Route C

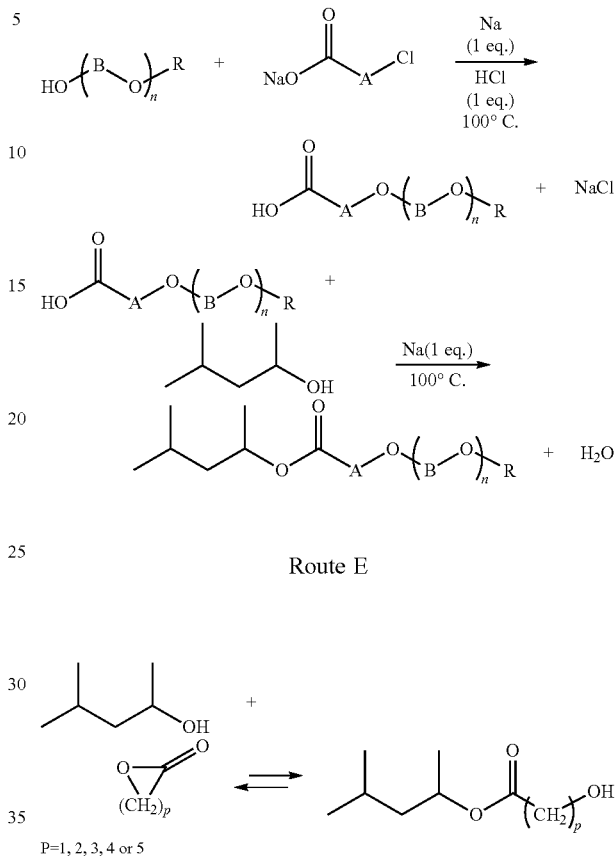

Route D

Route E

P = 1, 2, 3, 4 or 5

In the routes A to E above A, B, R and n are as previously defined.

The skilled person can easily adapt the reaction conditions to obtain the desired product with high yield. The skilled person may also find other reaction pathways to prepare the compounds according to the invention.

More complete details concerning some reaction conditions are given in the examples in experimental part.

In some other embodiments, the composition according to the invention further comprises at least one compound selected from the group consisting of frothers, collectors, water, compatibilizing agents, defoamers, dispersants, pH regulators, rheology regulators, surface active agents, activators, depressants, lubricants, anti-scalants and anti-corrosion agents. Preferably, the compound is selected from collectors and/or frothers.

The frother can be selected from the list consisting of phenols, alkyl sulfonates, aliphatic alcohols, cyclic alcohols, alkoxy paraffins, polyglycols, polypropylene glycol, polyglycol ethers, polypropylene glycol ethers, polyglycol glycerol ethers, pyridine derivatives and mixtures thereof.

Without being exhaustive, the frother can be selected from:
(i) phenols such as o-cresol, m-cresol, p-cresol, xylenols and phenol;
(ii) alkyl sulfonates, particularly alkyl aryl sulfonates;
(iii) aliphatic alcohols such as n-butanol, n-pentanol, isoamyl alcohol, n-hexanol, 2-ethyl hexanol, n-heptanol, methyl isobutyl carbinol (MIBC), caprylic acid, 4-heptanol, mixtures of C4-C7 alcohols and mixtures of C5-C8 alcohols;
(iv) cyclic alcohols such as terpineols and borneol;
(v) alkoxy paraffins e.g. 1,1,3-Triethoxybutane (TEB) and 1,3,5-Trialkoxypropyl trioxane;
(vi) polyglycol, polyglycol ethers e.g.
$R_2(X)_mOH$ with $R_2$=H or $C_nH_{2n+1}$ with n being an integer ranging from 1 to 6, with m being an integer ranging from 2 to 20 and X=EO (ethylene oxide), PO (propylene oxide) or BO (butylene oxide),

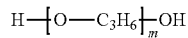

with m=4,5

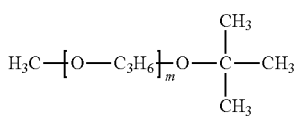

with m=3,4,5,6

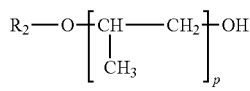

with $R_2$ comprises 4 to 6 C atoms
(vii) pyridine derivatives;
(viii) and mixtures thereof.

Collectors may be comprised in the composition according to the invention. Without wishing to be bound with a theory, collectors are reagents that are used to selectively adsorb onto the surfaces of particles to enhance its hydrophobic behavior and to increase the affinity with the froth. Selection of the correct collector is critical for an effective separation by froth flotation.

Suitable collectors can be selected from the list consisting of nonionic, anionic, cationic, amphoteric collectors and mixtures thereof.

Just as matter of example nonionic collectors can be hydrocarbon oils such as fuel oil, kerosene or small molecules like isopropylethylthionocarbamate (IPETC). Nonionic collectors are widely used in flotation of e.g. coal, molybdenite, elemental sulfur, copper and talc.

Anionic collectors are generally acids or acid salts that ionize in water and can be selected from
(i) organic sulfur-containing compounds such as xanthates (e.g. ethyl xanthate), monothiophosphates, monothiophosphinates, dithiophosphates, dithiophosphinates, dithiocarbamates, trithiocarbonates, alkylsulfates, sulfonates, sulfosuccinates, sulfosuccinamates, generally as sodium, potassium or ammonium salts,
(ii) organic phosphorous-containing compounds such as phosphonic acids and phosphoric acid esters, generally as sodium, potassium or ammonium salts,
(iii) carboxylic acids e.g. capric acid, lauric acid, myristic acid, oleic acid, stearic acid, palmitic acid, linoleic acid, synthetic saturated or unsaturated fatty acids, tall oils, generally as sodium, potassium or ammonium salts such as sodium oleate,
(iv) mixtures thereof.

Just as matter of example xanthates are particularly selective collector for sulfide minerals while sodium salt of oleate is typically used for oxide mineral flotation.

Cationic collectors generally bear positively charged amine group which can be primary, secondary or tertiary amine group. Quaternary ammonium salts can also be used as cationic collectors. Cationic collectors are employed in flotation of e.g. silicates and rare-metal oxides.

Amphoteric collectors are compounds bearing one or more cationic functional group and one or more anionic functional group. Common types are long chain amino acids such as cetyl amino acetic acid, N-lauryl-p-amino propionic acid, N-lauryl-β-iminodipropionic acid, N-lauryl-β-aminobutyric acid or long chain amino sulfonic acids such as N-myristyl taurine.

Certain other reagents, referred to as "modifiers", may be comprised in the composition according to the invention to enhance separation and recovery of the desired minerals and/or metals. Modifiers, which can include pH regulators, may be used to modify and control the pH of the slurry in order to enhance separation and recovery of the desired minerals and/or metals. Rheology regulators, may be used to modify and control the rheology of the slurry in order to enhance separation and recovery of the desired minerals and/or metals.

In some instances, compounds referred to as "activators" and to as "depressants" may be added to the composition according to the present invention.

Typically activators are specific compounds which are used to activate a certain value mineral. As a matter of example, copper sulfate is used in order to enhance collector coating on specific value sulfide.

Depressants generally prevent the collectors from absorbing onto specific mineral surfaces; they are used to improve selectivity. As suitable depressants one can cite cyanides, lime which is added as CaO or $Ca(OH)_2$, starch and lignine.

In some other embodiments, the composition according to the invention comprises water.

The composition may also comprise some other products such as side reactions products coming from the synthesis of the compound of formula (I).

Flotation Process

In a second aspect, the present invention pertains to a flotation process for recovering value minerals from ore and other feedstocks comprising adding to said ore and other feedstocks a composition comprising at least one compound of formula (I):

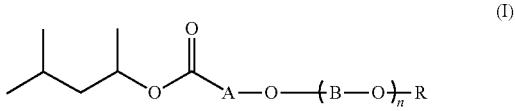

(I)

n wherein A, B, R and n are as previously defined.

The flotation process according to the present invention is directed towards recovery of value minerals from ore and other feedstocks.

In some embodiments, the flotation process according to the present invention comprises adding to the ore in the form of crushed ore, ground ore and/or of aqueous slurry a composition comprising at least one compound of formula (I) having all the possible features and all the possible embodiments that have been previously described.

In some other embodiments, the flotation process according to the present invention comprises adding to any other feedstock a composition comprising at least one compound of formula (I) having all the possible features and all the possible embodiments that have been previously described.

The term value minerals refers to the metal, metals, mineral, minerals, energy mineral or energy minerals that are the primary object of the flotation process, i.e., the metals, minerals and energy minerals from which it is desirable to remove impurities.

In some embodiments, the value minerals are sulfide minerals, non-sulfide minerals or native metals.

In some preferred embodiments, the value mineral is sulfide mineral and sulfide mineral feedstock/ore is e.g., sulfide ores, historical tailings, cyclone underflow, sinks, etc., or combinations thereof. The sulfide mineral feedstock/ore includes Cu—Mo ores, Cu—Au ores, primary Au ores, platinum group metals ores. Cu ores, Ni ores, Ni—Cu ores, and ores including Pb, Zn, Cu, and/or Ag. Value metals of interest include, for example, gold, silver, platinum, palladium, other platinum group metals, copper, nickel, molybdenum, cobalt, lead, and zinc. The value mineral feedstock/ore is composed of copper-containing, minerals, e.g., chalcopyrite, chalcocite, bornite, covellite; gold-containing minerals, e.g., electrum, pyrite, marcasite, Cu sulfide minerals, and arsenopyrite; molybdemun-containing minerals e.g., molybdenite; lead-containing minerals, e.g., galena; zinc-containing minerals, e.g. sphalerite and marmatite; silver-containing minerals, e.g. argentite, freibergite, argentiferous pyrite and argentiferous galena; nickel-containing minerals, e.g., pentlandite; platinum group metal-containing minerals, e.g., sperrylite; or combinations thereof.

In some other preferred embodiments, the value mineral is non-sulfide mineral and feedstock/ore is a non-sulfide mineral feedstock/ore. The term non-sulfide mineral comprises minerals belonging to the following classes: oxides, silicates, sulfates, phosphates, carbonates and halides. Just as matter of example non-sulfide mineral feedstocks/ores include phosphate, iron oxides, kaolinite and bentonite, spodumene, potash, borates, trona, fluorite, calcite, dolomite, limestone, barite, mica, feldspars, quartz, silica sand, monazite, kyanite, magnesite, chromite, bauxite, ilmenite, rutile, manganese oxides, graphite, talc, and cassiterite.

Still in some preferred embodiments, the value mineral is native metal and feedstock/ore are e.g. gold, silver or copper feedstock/ore.

In some other embodiments, the value minerals are energy minerals such as coal and the value mineral feedstock is a slurry of coal and guangue (raw coal) comprising e.g. carbonaceous materials with high ash content, shale, clay, and other non-carbonaceous impurities minerals such as kaolinite, quartz, dolomite, calcite, muscovite, pyrite and microline.

Raw coal can be high rank coals such as anthracite or hard coal, middle rank coals such as bituminous coal or low rank coals such as subbitiminous coal, lignite or aka brown coal.

In a third aspect the invention relates to the use of a composition comprising at least one compound of formula (I):

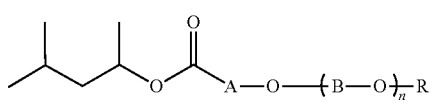

(I)

wherein A, B, R and n are as previously defined, for recovering value minerals from ores and other feedstocks by flotation.

The use according to the invention relates to a composition having all the possible features and all the possible embodiments that have been previously described.

The invention will now be illustrated in more detail with reference to the following examples, which are not intended as being limiting.

EXAMPLES

Preparation of "Cleavable" Frothers

Synthesis of 4-methylpentan-2-yl 2-hydroxyacetate (Frother 1)

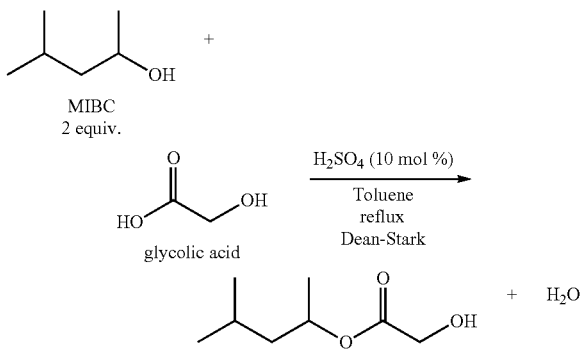

In a 500-mL round-bottom flask were added successively glycolic acid (13.8 g, 180 mmol, 1 equiv), 4-methyl-2-pentanol (MIBC) (37.6 g, 360 mmol, 2 equiv), and toluene (230 mL) followed by sulfuric acid (96%) (1 mL, 18 mmol, 0.1 equiv). The resulting solution was heated under reflux and water was removed azeotropically using a Dean-Stark apparatus. After 3 h water had finished to distill and the reaction mixture was allowed to cool to room temperature. The resulting solution was washed with a saturated aqueous solution of $NaHCO_3$ (twice) followed by a saturated aqueous solution of NaCl. The organic phase was dried over anhydrous magnesium sulfate and the volatiles (toluene and excess MIBC) were removed in vacuo. The crude product was purified by flash chromatography on silica gel to yield a first fraction of desired MIBC glycolate as a colorless liquid (15 g, 52% yield).

Alternative Synthesis of 4-methylpentan-2-yl 2-hydroxyacetate (Frother 1)

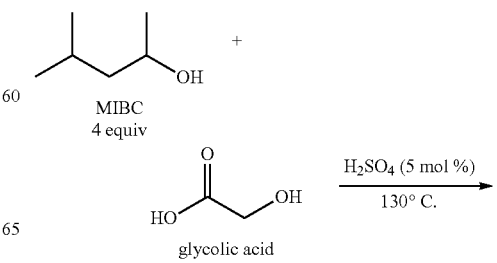

-continued

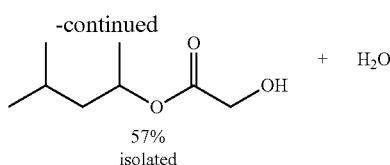

57% isolated

In a 250-mL round-bottom flask were added successively glycolic acid (30.4 g, 396 mmol, 1 equiv), 4-methyl-2-pentanol (MIBC) (200 mL, 1.54 mol, 4 equiv), and sulfuric acid (96%) (1.1 mL, 20 mmol, 0.05 equiv). The resulting solution was heated at 130° C. for 6 h. The reaction mixture was then allowed to cool to room temperature and calcium carbonate (4.5 g) was added and the resulting suspension was stirred overnight. The white solid in suspension was then filtered and excess MIBC was removed in vacuo. The remaining crude product was purified by distillation to give MIBC glycolate as a colorless liquid (36 g, 57% yield).

Synthesis of ethyl 2-(2-hydroxyethoxy)acetate

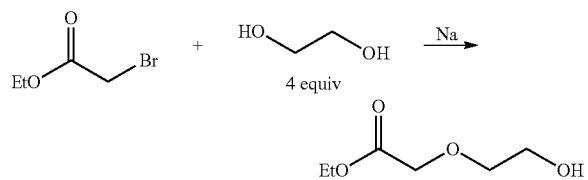

As described in J. Photosci. 2000, 7, 143-148.

Synthesis of 4-methylpentan-2-yl 2-(2-hydroxyethoxy)acetate (Frother 2)

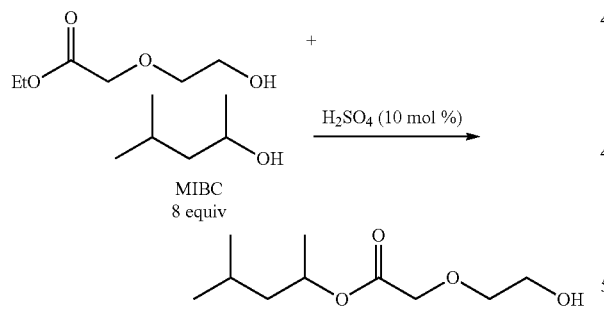

In a 100-mL round-bottom flask were added successively ethyl 2-(2-(2-hydroxyethoxy)ethoxy)acetate (20 g, 132 mmol, 1 equiv), 4-methyl-2-pentanol (MIBC) (52.1 g, 565 mmol, 4.3 equiv), and sulfuric acid (96%) (0.7 mL, 12.6 mmol, 0.1 equiv). The resulting solution was heated at 50° C. for 24 h. The reaction mixture was then allowed to cool to room temperature and calcium carbonate (15 g) was added and the resulting suspension was stirred overnight. The white solid in suspension was then filtered and excess MIBC was removed in vacuo. [Care should be taken at this step since remaining traces of acidity or overheating will lead to product cyclization and liberation of MIBC.] The remaining crude product (7.8 g) was purified by flash chromatography on silica gel to give the desired product as a colorless liquid (6.2 g, 23% yield).

Synthesis of ethyl 2-(2-(2-hydroxyethoxy)ethoxy)acetate

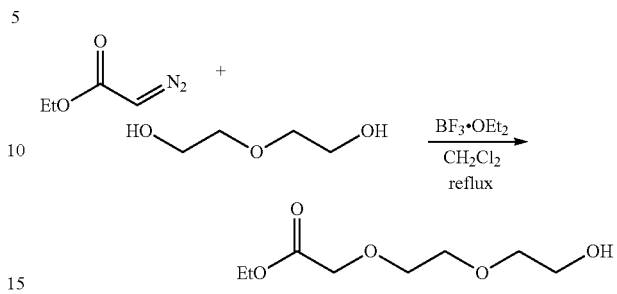

As described in Langmuir 2013, 29, 13111-13120.

Synthesis of 4-methylpentan-2-yl 2-(2-(2-hydroxyethoxy)ethoxy)acetate (Frother 3)

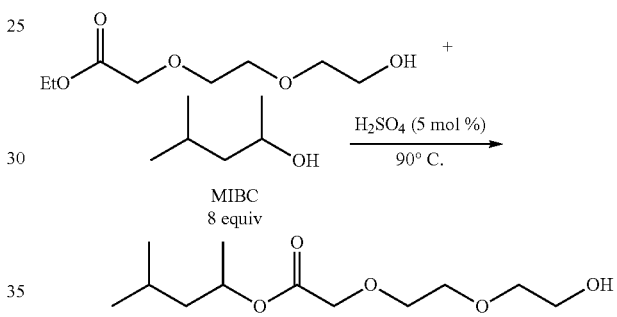

In a 250-mL round-bottom flask were added successively ethyl 2-(2-(2-hydroxyethoxy)ethoxy)acetate (30.3 g, 155 mmol, 1 equiv), 4-methyl-2-pentanol (MIBC) (125.1 g, 156 mL, 1.2 mol, 8 equiv), and sulfuric acid (96%) (0.4 mL, 7.2 mmol, 0.05 equiv). The resulting solution was heated at 90° C. for 24 h. The reaction mixture was then allowed to cool to room temperature and calcium carbonate (5 g) was added and the resulting suspension was stirred overnight. The white solid in suspension was then filtered and excess MIBC was removed in vacuo. The remaining crude product (32.2 g) was purified by flash chromatography on silica gel to give the desired product as a colorless liquid (25.4 g, 66% yield).

Synthesis of ethyl 2-(2-(2-(2-hydroxyethoxy)ethoxy)ethoxy)acetate

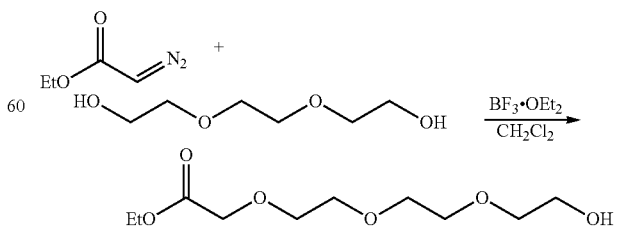

As described in Langmuir 2013, 29, 13111-13120.

Synthesis of 4-methylpentan-2-yl 2-(2-(2-(2-hydroxyethoxy)ethoxy)ethoxy)acetate (Frother 4)

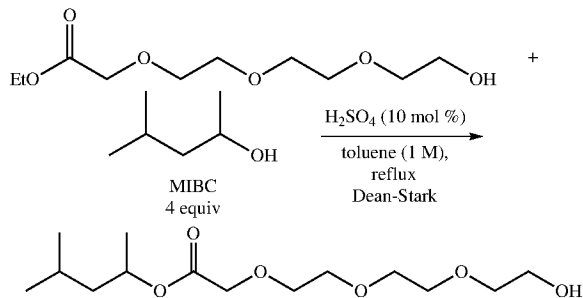

In a 250-mL round-bottom flask were added successively ethyl 2-(2-(2-(2-hydroxyethoxy)ethoxy)ethoxy)acetate (15 g, 63.5 mmol, 1 equiv), 4-methyl-2-pentanol (MIBC) (26 g, 156 mL, 254 mmol, 4 equiv), toluene (150 mL), and sulfuric acid (96%) (0.38 mL, 6.8 mmol, 0.1 equiv). The resulting solution was heated under reflux and ethanol was removed azeotropically using a Dean-Stark apparatus. After 10 h the reaction mixture was allowed to cool to room temperature. Calcium carbonate (4 g) was added and the resulting suspension was stirred overnight. The white solid in suspension was then filtered and excess MIBC was removed in vacuo. The remaining crude product (22.3 g) was purified by flash chromatography on silica gel to give the desired product as a colorless liquid (7.6 g, 35% yield).

Synthesis of 4-methylpentan-2-yl 4-hydroxybutanoate (Frother 5)

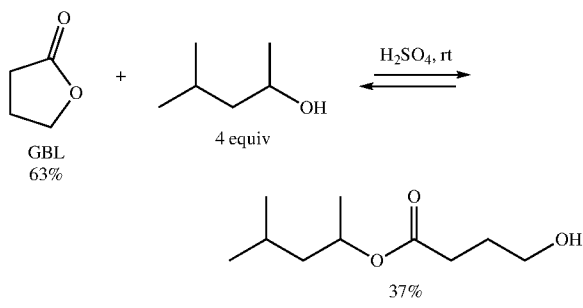

In a 250-mL round-bottom flask were added successively γ-butyrolactone (GBL) (20 g, 230 mmol, 1 equiv), 4-methyl-2-pentanol (MIBC) (100 g, 979 mol, 4 equiv), and sulfuric acid (96%) (0.5 g, 4.9 mmol, 0.02 equiv). The resulting solution was stirred at room temperature for 14 h time after which the equilibrium was reached (GBL/ester=63:37 by $^1$H NMR). Calcium carbonate (3 g) was then added and the resulting suspension was stirred for 1 h. The white solid in suspension was then filtered and the filtrate was diluted with AcOEt (200 mL). The organic phase was washed with a $Na_2CO_3$ solution (1% in water, 100 mL), water (2×100 mL), and finally by a saturated NaCl solution (100 mL). The organic phase was then dried over $MgSO_4$, filtered and the resulting oil was purified by flash chromatography on silica gel to give the desired product as a colorless oil (13 g, 30% yield).

Flash Point Determination

The flash point of Frother 1 was determined using ASTM method D3828-87, method B, finite flash point method, also known as Setaflash closed cup method. Approximately 2 mL of the sample was placed in the cup and tested at 22° C., 35° C., 50° C., 70° C., 80° C., 85° C. and 87° C. The lowest temperature at which the combustion of the headspace is observed is defined as the flash point.

With a flash point of 87° C. Frother 1 is far less flammable than MIBC with a flash point of 41° C. This is highly advantageous for safety reasons either during storage and transport or during utilisation of this type of frothers.

Hydrolysis of "Cleavable" Frother

In a 100 mL flask were added DI water (50 g), $Ca(OH)_2$ for adjusting the pH to 12, and "cleavable" Frother (20 µL). The resulting solution was stirred at room temperature for 24 h time after which the complete hydrolysis was reached (checked by LC-MS when the ester peak disappeared).

The resulting solution was used in the flotation test to evaluate the "cleavable" frothers flotation performance after hydrolysis.

Flotation Test

Before flotation tests in a Denver cell, a sample of 1 Kg Cu—Mo ore crushed to 2 mm and 0.6 g $Ca(OH)_2$ were milled in a laboratory stainless ball mill in the presence of 675 ml of water to achieve a grind of 80% passing 212 µm. The pH of the resulting slurry was 9.8. The milled slurry was transferred to flotation cell with a capacity of 2.7 L and diluted to 32% solids content. The impeller speed was set at 1000 r/min and the slurry was agitated. Reagent addition strategy and flotation procedures were as follows: the collector was added into the flotation pulp, and the pulp was homogenized for 1 min; then, frother was added, and the pulp was homogenized for another 45 s. Airflow was turned on and the froth was scraped every 15 seconds for a total time of seven minutes to collect a Cu concentrate. The air flow rate supplied to the flotation cell was maintained at a flow rate of 3.25 L/min in all test. The pulp level was kept at the same level by addition of water.

The After tests, concentrates and tails were filtered, dried, weighed and analyzed for Cu content.

Cu ore information used in the flotation tests are presented in Table 1.

TABLE 1

Assays for Cu—Mo ore used in the flotation tests.

| Ore head assay | Cu wt. % | Fe wt. % | Mo ppm | Gangue wt. % |
|---|---|---|---|---|
| Cu—Mo Ore | 0.45 | 4.62 | 62 | 79.04 |

Determination of water recovery (water rec.%), was performed using the equation below:

$$\text{Water } rec. \% = \frac{C \text{ (g)} - C \text{ dried (g)} \times 100}{W \text{ (g)}}$$

With:
C=concentrate collected in function of time (water+solids);
C dried (g)=solids after concentrate drying;
W=total mass of water added in the cell.

Copper recovery (Cu rec. wt. %), Copper concentrate grade (Cu grade wt. %) were determined by analyzing the Cu content of ore, concentrates and tailings.

Coarse particles recovery % was determined by passing collected concentrates on 212 μm sieve.

Results

Flotation tests were performed using isopropylethylthionocarbamate (IPETC) as collector.

Blend of glycol ether are well known in the industry as strong frother and methyl isobutyl carbinol (MIBC) is well known as weak frother. Comparative examples were carried out using AEROFROTH® 68 (AF68—Blended Glycol Ethers) or AEROFROTH® 70 (AF70—MIBC=Methyl Isobutyl Carbinol) available from Solvay as "strong" or "weak" frothers respectively.

A first flotation test was performed at pH 9.5, which is a relatively low pH, which was chosen to simulate pH conditions of a rougher stage.

TABLE 2

Results of flotation test* before hydrolysis of the "cleavable" frother

| Frother | Water Rec. % | Cu Rec. % | Cu Grade % total | Coarse*** particles Rec. % |
|---|---|---|---|---|
| AF68 Blended Glycol Ethers | 12 | 85 | 8.7 | 6.8 |
| AF70 MIBC | 9 | 80 | 9.3 | 4.3 |
| Frother 1 | 13 | 86 | 8.4 | 7.0 |
| Frother 2 | 15 | 84 | 8.1 | n.d. |
| Frother 3 | 15 | 85 | 8.2 | 7.2 |
| Frother 4 | 15 | 87 | 7.4 | 5.9 |
| Frother 5 | 15 | 87 | 8.0 | 5.5 |
| Blend** | 16 | 84 | 8.2 | 6.4 |

*Flotation at pH 9.5 during 7 minutes.
**Blend consisting of a solution comprising 6 ppm of Frother 1, 4 ppm of Frother 2, 6 ppm of Frother 3 and 5 ppm of Frother 4.
***particles size >212 μm.

Results of table 2 reveal that surprisingly Frothers 1 to 5 are strong frothers allowing higher water recovery than MIBC and more surprisingly than blended glycol ethers. Even more surprisingly, the blend of Frothers 1 to 4 shows similar performance.

Moreover, Cu recovery and Cu grade are similar for flotation conducted respectively with Frother 1, Frother 2, Frother 3, Frother 4, Frother 5 and with a blend of "cleavable" frothers and for flotation conducted with blended glycol ethers.

Finally, Frothers 1, 3, 4 and 5 are strong frothers allowing higher coarse particles recovery than MIBC and more surprisingly even higher coarse particles recovery than blended glycol ethers in the case of Frothers 1 and 3. The blend of Frothers 1 to 4 allows higher coarse particles recovery than MIBC.

As said, hydrolysis of Frothers 1 to 5, and of the blend of Frothers 1 to 4 was conducted at pH 12 by stirring their solution in water at 23° C. during 24 hours.

A second flotation test was then performed at pH 9.5 using the resulting hydrolyzed frothers or blend of frothers.

TABLE 3

Results of flotation test* after hydrolysis of the "cleavable" frothers

| Frother | Water Rec. % | Cu Rec. % | Cu Grade % total |
|---|---|---|---|
| AF68 Blended Glycol Ethers | 12 | 85 | 8.7 |
| AF70 MIBC | 9 | 80 | 9.3 |
| Frother 1 | 11 | 82 | 8.6 |
| Frother 3 | 8 | 72 | 9.1 |
| Frother 4 | 10 | 83 | 9.2 |
| Frother 5 | 9 | 79 | 8.6 |

*Flotation at pH 9.5 during 7 minutes.

It is clear from the results compiled in table 3 that Frothers 1, 3, 4 and 5 which behaved like blended glycol ethers before hydrolysis behave more like MIBC after hydrolysis.

Without being bound to any theory it is assumed that the ester function of Frothers 1, 3, 4 and 5 was hydrolyzed thus giving hydrolysis products and MIBC and that surprisingly the mixture of them behaves like MIBC.

The inventors have shown that a frother composition according to the invention which initially behaves as a strong frother and which is hydrolyzed to give hydrolysis products and MIBC, adopts after hydrolysis the frothing behavior of MIBC.

The inventors have shown that frothers and compositions of frothers according to the invention can surprisingly behave as strong frother at a given pH with some performances exceeding those of well known strong frothers (e.g. blended glycol ethers) while behaving like less strong or even weak frother after or during a stage at higher pH.

Moreover the inventors have shown that these frothers and compositions, at least because of a higher flash point, are advantageous in term of safety to store, transport or handle versus other frothers such as MIBC.

The invention claimed is:

1. A flotation process for recovering value minerals from ore and other feedstocks comprising adding to said ore and other feedstocks a composition comprising at least one compound of formula (I):

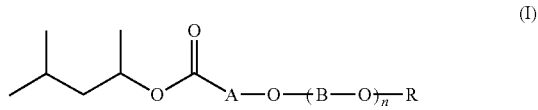

wherein:
A represents a C1-C8 alkanediyl group that may be linear, branched or cyclic,
B which can be the same or different at each occurrence, represents a C1-C8 alkanediyl group that may be linear, branched or cyclic,
R represents H or a C1-C8 alkyl group that may be linear or branched, and
n is an integer ≥0 and ≤100.

2. The flotation process according to claim 1, wherein the value minerals are sulfide minerals, non-sulfide minerals or native metals.

3. The flotation process according to claim 1, wherein the value minerals are energy minerals.

4. The flotation process according to claim 1, wherein the composition further comprises at least one compound selected from the group consisting of frothers, collectors, water, compatibilizing agents, defoamers, dispersants, pH regulators, rheology regulators, surface active agents, activators, depressants, lubricants, anti-scalants and anti-corrosion agents.

5. The flotation process according to claim 4, wherein the composition further comprises frothers and/or collectors.

6. The flotation process according to claim 1, wherein the composition comprises at least one compound selected from the list consisting of:

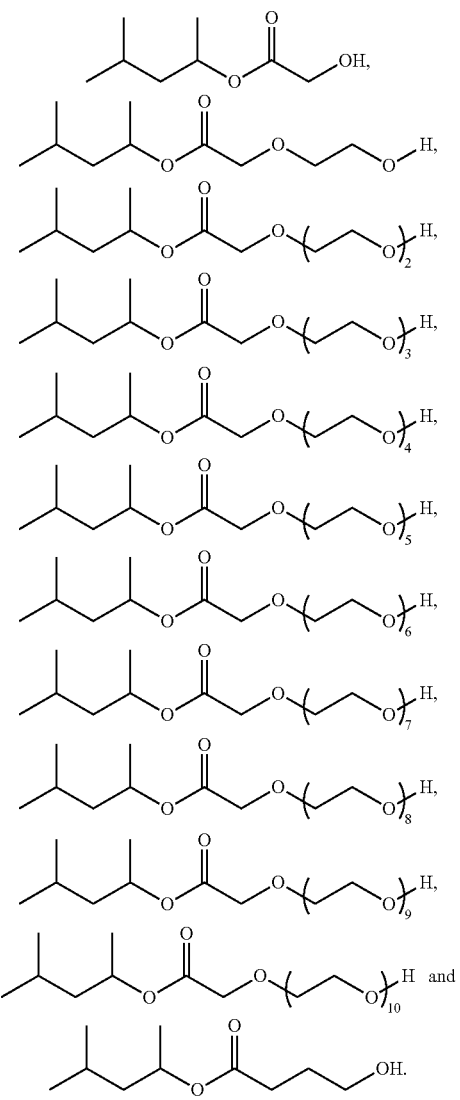

7. The flotation process according to claim 6, wherein the composition further comprises at least one compound selected from the group consisting of frothers, collectors, water, compatibilizing agents, defoamers, dispersants, pH regulators, rheology regulators, surface active agents, activators, depressants, lubricants, anti-scalants and anti-corrosion agents.

8. The flotation process according to claim 1, wherein the composition comprises at least one compound selected from the list consisting of:

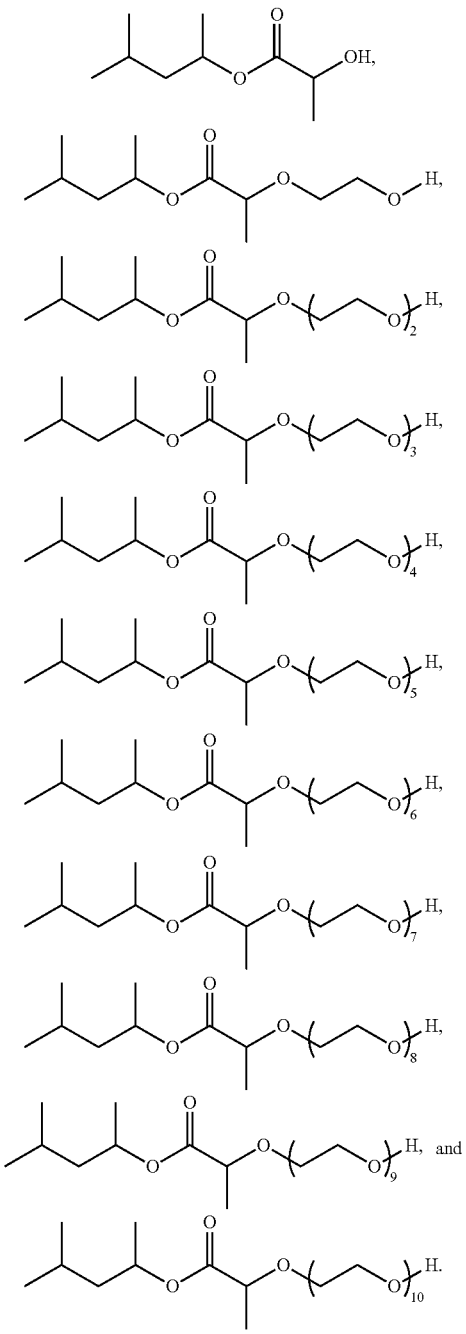

9. The flotation process according to claim 8, wherein the composition further comprises at least one compound selected from the group consisting of frothers, collectors, water, compatibilizing agents, defoamers, dispersants, pH regulators, rheology regulators, surface active agents, activators, depressants, lubricants, anti-scalants and anti-corrosion agents.

* * * * *